May 22, 1962 E. K. THOMPSON 3,035,741
ELECTRICALLY DRIVEN FARM SEEDER
Filed April 7, 1960 2 Sheets-Sheet 1

INVENTOR.
Eugene K. Thompson
BY
Maxwell V. Allan
ATTORNEY.

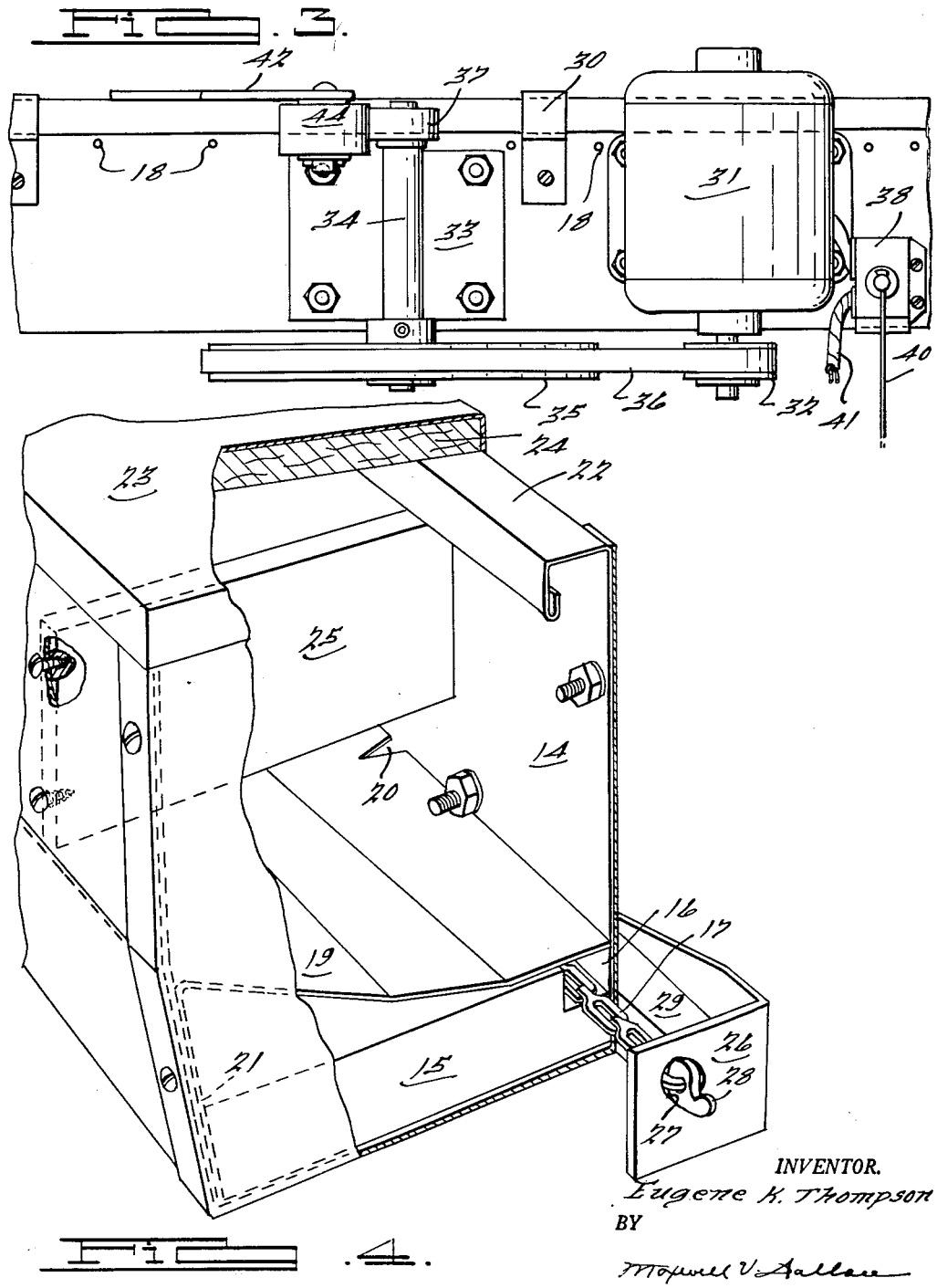

United States Patent Office 3,035,741
Patented May 22, 1962

3,035,741
ELECTRICALLY DRIVEN FARM SEEDER
Eugene K. Thompson, F.D. 1, Tecumseh, Mich.
Filed Apr. 7, 1960, Ser. No. 20,665
1 Claim. (Cl. 222—178)

This invention relates to seeders, and more particularly to a new and improved farm seeder that may be attached to a farm tractor and operated electrically from a storage battery carried by the tractor so that a smooth, even distribution of seed is provided from the seeder hopper.

Another object of the invention is to provide a new and improved seeder whereby through the simple interchange of cams designed for different settings per pound of seed per acre, the user may quickly change from one cam to another and be sure that the number of pounds of seed required per acre will be sown.

A still further object of the invention is to provide a new and improved seeding device whereby through an electrically operated shaker device the seeder seeds every square foot of ground alike preventing thick or thin streaks.

The above and other objects of the invention will appear more clearly from the following description, and from the drawings, wherein:

FIG. 3 is a bottom view of the seeder taken substantially along line 3—3 of FIG. 2; and FIG. 4 is a perspective view of the device having parts thereof broken away looking in the direction of numeral 4, FIG. 1.

Figure 1:
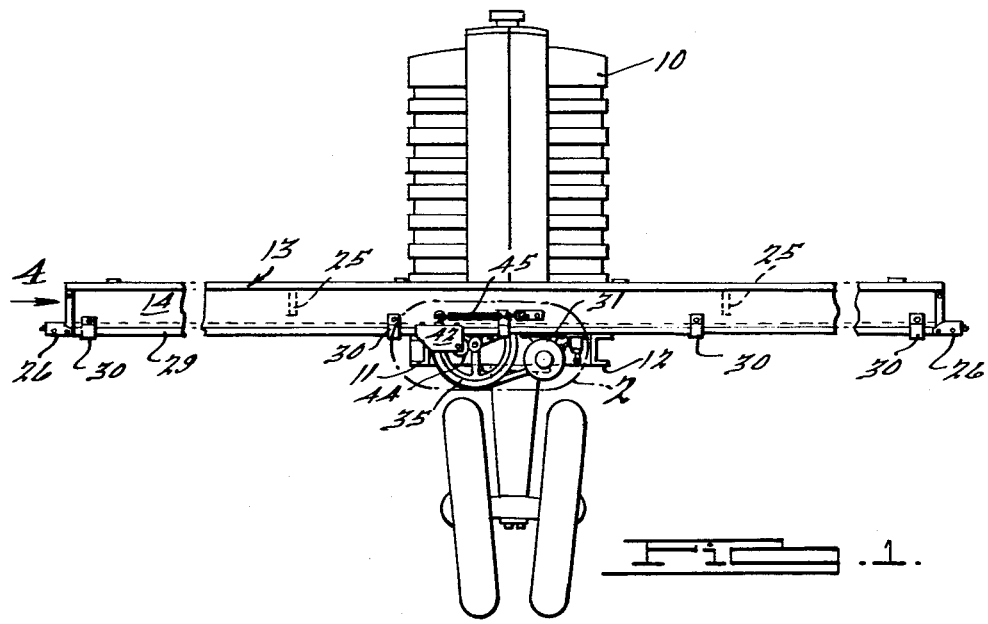
FIG. 1 is a vertical elevational view of a tractor showing the seeder mounted thereon.
Figure 2:
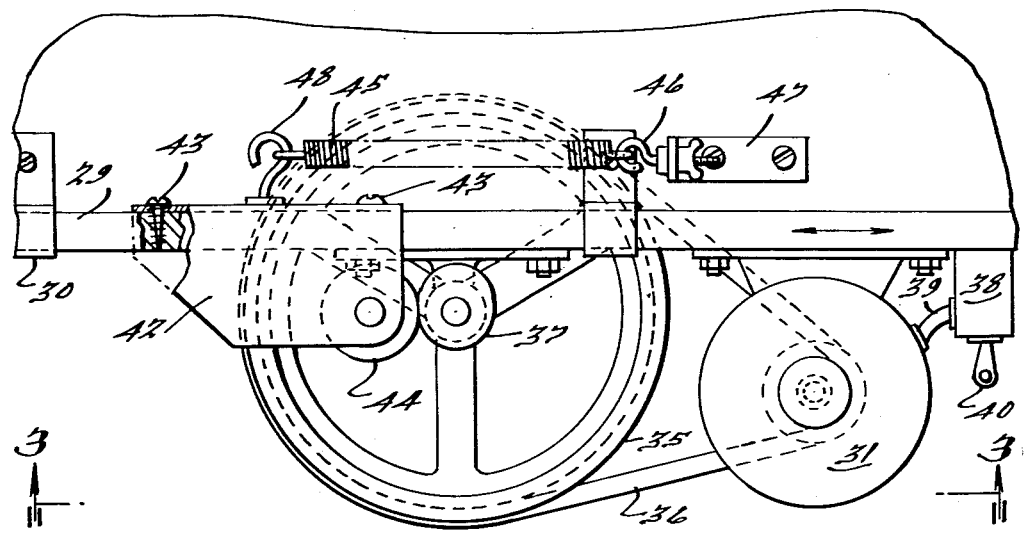
FIG. 2 is an enlargement of the seeder, taken from FIG. 1, showing in detail the reciprocating means for shaking the seed free from the hopper.

Referring now to the drawings, the numeral 10 designates a standard farm tractor which has secured to the undercarriage thereof a pair of opposed studs 11, 12, which protrude out beyond the front of the tractor and provide supporting means for the seeder 13. The seeder per se comprises a hopper 14, the same being constructed of metal, or the like, rectangular in shape, having a wooden bottom 15 seated therein upon the metal bottom of the hopper, said wooden bottom having a portion thereof cut away, as at 16, to form a trough or guideway for seed feeder chain 17. A plurality of openings 18 are formed in trough 16 of bottom 15 to allow seed to fall therethrough. Superimposed above wooden bottom 15 is a metal seed guide floor 19, the same being slanted toward a plurality of seed openings 20, said seed guide being bent downwardly at the back thereof, as at 21, to strengthen same and the slope of the guide makes the hopper self-cleaning at all times as the seed tends to move toward openings 20. The top or leading edge of the hopper 14, is rolled down, as at 22, for strength and a cover 23 is formed to fit down over the hopper and acts as a closure therefor, the same having a wooden brace 24 therein to strengthen same, so that when the cover is installed the entire assembly is leak-proof. A plurality of partitions 25 are provided, the same being approximately two feet apart for hopper support and to keep the seed in the hopper from shifting. A pair of shaker end clips 26 are provided, the same being secured to opposed ends of a shaker bar 29, said clips having openings 27 therein to hold securely chain stops 28 which in turn hold shaker chain 17 in shaker clips. Shaker bar 29 is supported on the outside of the hopper 14 and is slidably supported thereon by means of brackets 30.

To reciprocate the shaker bar 29 and hence chain 17, there is provided a driving mechanism comprising a 6 or 12 volt D.C. electric motor 31 bolted to the bottom of the hopper having a pulley 32 journaled on the armature shaft of the motor 31. A plate 33 is also bolted to the bottom of the hopper and rotatably supports shaft 34 which has secured to one terminal thereof a wheel 35 adapted to receive and hold in place V-belt 36. The opposite terminal of shaft 34 is adapted to interchangeably receive a plurality of cam members 37, said cam members having the openings therein set over, each cam being adapted for a different setting for pounds of seed per acre. To energize said motor 31 there is provided a switch 38, a lead wire 39 from the switch to the motor, and a lead wire 40 to the steering column of the tractor so that switch 38 may be thrown off or on as desired. Lead wire 41 leads to a 6 or 12 volt D.C. storage battery, not shown, but is carried by the tractor. A plate 42 is secured to shaker bar 29 by means of screws 43. Journaled in said plate 42 is a shaker roller 44 which in turn rides cam 37 to provide different lengths of stroke of shaker bar 29. To return shaker bar 29 to its normal position there is provided a spring member 45, one end of which is secured to an eye-hook 46 which in turn is supported on the hopper by plate 47 and the other end of said spring 45 is secured to a hook 48 which in turn is secured in shaker rod 29 through plate 42.

The manner in which the device operates is as follows:
The top of the hopper 23 is removed and seed is placed in the spaced-apart compartments within the hopper partitions 25 acting as baffles to keep the seed from shifting about in the hopper. The top is then replaced to prevent loss of seed and moisture reaching the seed. The user then selects the cam he wishes to use for the particular sowing at hand and secures the same to shaft 34. Four separate cams are needed for different settings for different sowings of seed—each cam is marked or numbered one through four. Number one equals four pounds per acre. Number two equals eight pounds per acre. Number three equals twelve pounds per acre and number four equals fifteen pounds per acre—the cam off-center opening being such that the above quantity of seed has been pre-determined by test. When the tractor has been moved to the spot to be seeded, the driver simply pulls line 40, which in turn is mounted on the steering column of the tractor. This turns on switch 38 and power from the tractor storage battery energizes motor 31 and in turn pulley on the motor armature is rotated, which rotates belt run 36 and wheel 35 and cam 37 on shaft 34. Cam 37 engages shaker roller 44 which in turn is rotatably supported in plate 42 secured to shaker rod 29. As the rod 29 is reciprocated to the left, shaker end clips 26 with chain 17 secured thereto, also reciprocates to the left, and as cam 37 passes around, spring 45 snaps shaker rod 29 to the right so that there is a continuous reciprocating movement of chain 17. Curved bottom 19 of the hopper tends to move the seed down into openings 20 inside hopper where it falls into trough 16 and on through openings 18 to the ground—chain 17 acting as an agitator to shake the seed free. The electric motor actuating cam 37 tends to provide a constant, even distribution of the seed from the hopper to the ground eliminating thick and thin streaks so often found with seeders run from the power take-off or other mechanical means.

The present seeder seeds every square foot alike. The sixteen foot hopper has thirty-eight discharge holes and the device will sow five different size seeds without separation. With the hopper located in front of the tractor the operator can see the seeder operate at all times, and with a hopper capacity of one bushel it does not require constant stopping to refill. To turn off the seeder, the operator simply again pulls line 40 from the driver's seat and in turn turns off motor 31.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

A farm seeder for use in combination with a tractor having front supports, comprising an elongated feed hopper to hold seed mounted upon said front supports, said hopper having a floor member therein having a trough portion formed therein and a plurality of seed openings through said trough portion, a superimposed slanted floor mounted within said hopper having a plurality of openings therein leading to said trough portion in said lower floor member, a shaker rod member slidably mounted on one side of said seeder having a chain member threaded through said trough and secured to the ends of said shaker rod, a plate member secured to said shaker rod having a shaker roller rotatably journaled therein, a spring member having one end thereof secured to said plate on said shaker rod and the other end thereof secured to the side of said seed hopper, a drive pulley journaled beneath said hopper having a shaft member therein adapted to interchangeably receive and rotate a selected cam member having openings therein, said cam being adapted for a predetermined different setting for the quantity in pounds of seed per acre to be shaken by said shaker rod out of said opening in accordance with the cam selected, while holding said cam in rotatable contact with said shaker roller, an electric motor secured to the bottom of said seed hopper, the same being actuated by electric current from a storage battery to drive said drive pulley, belt means from said motor to said pulley, a switch to control said motor and a lead wire from said switch to the steering column of said tractor to turn said motor on and off so that when said motor drives said pulley and hence said selected cam in contact with said shaker roller, said shaker rod is reciprocated, shaking out of said hopper trough openings a predetermined quantity of seed per acre.

References Cited in the file of this patent

UNITED STATES PATENTS

| | | |
|---|---|---|
| 219,769 | Roys | Sept. 16, 1879 |
| 230,754 | Davis | Aug. 3, 1880 |
| 2,554,074 | Tuttle | May 22, 1951 |
| 2,701,664 | Thompson | Feb. 8, 1955 |
| 2,801,773 | Vitkin | Aug. 6, 1957 |